United States Patent
Watts et al.

(10) Patent No.: US 11,987,266 B2
(45) Date of Patent: May 21, 2024

(54) DISTRIBUTED PROCESSING OF VEHICLE SENSOR DATA

(71) Applicant: Hitachi Astemo, Ltd., Ibaraki (JP)

(72) Inventors: Lars Stephen Watts, Ibaraki (JP); Kota Irie, Ibaraki (JP); Hidetoshi Arima, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 192 days.

(21) Appl. No.: 17/680,503

(22) Filed: Feb. 25, 2022

(65) Prior Publication Data

US 2023/0271628 A1     Aug. 31, 2023

(51) Int. Cl.
*B60W 60/00*     (2020.01)
*G06V 10/70*     (2022.01)
*G06V 20/56*     (2022.01)

(52) U.S. Cl.
CPC .......... *B60W 60/001* (2020.02); *G06V 10/87* (2022.01); *G06V 20/56* (2022.01); *B60W 2520/06* (2013.01); *B60W 2520/10* (2013.01); *B60W 2720/24* (2013.01)

(58) Field of Classification Search
CPC .......... B60W 60/001; B60W 2520/06; B60W 2520/10; B60W 2720/24; B60W 50/023; G06V 10/87; G06V 20/56
See application file for complete search history.

(56) References Cited

U.S. PATENT DOCUMENTS

| | | | | |
|---|---|---|---|---|
| 9,429,443 | B2* | 8/2016 | Hoch | B60W 40/107 |
| 10,011,278 | B2* | 7/2018 | Himi | G01S 15/931 |
| 11,321,399 | B1* | 5/2022 | Geertsema | G06F 21/44 |
| 11,550,322 | B1* | 1/2023 | Christie | G05D 1/0255 |
| 2012/0083964 | A1* | 4/2012 | Montemerlo | B60T 17/18 |
| | | | | 701/25 |
| 2017/0008517 | A1* | 1/2017 | Himi | G01S 15/87 |
| 2019/0100237 | A1* | 4/2019 | Klesing | B62D 5/0493 |
| 2020/0125858 | A1* | 4/2020 | Bauer | H04L 12/422 |

(Continued)

FOREIGN PATENT DOCUMENTS

| | | | |
|---|---|---|---|
| CN | 201191369 Y | * | 2/2009 |
| CN | 203164726 U | * | 8/2013 |

(Continued)

*Primary Examiner* — Redhwan K Mawari
(74) *Attorney, Agent, or Firm* — MATTINGLY & MALUR, PC

(57) ABSTRACT

In some examples, a first electronic control unit (ECU) receives zone sensor data of a plurality of zones associated with a vehicle. For instance, a respective second ECU and a respective set of zone sensors is associated with each respective zone of the plurality of zones. Based on an indicated driving mode of the vehicle, the first ECU may perform recognition on the zone sensor data from a first zone of the plurality of zones to determine first recognition information. The first ECU receives second recognition information from the respective second ECUs of the respective zones. For instance, the respective second ECUs are configured to perform recognition processing on respective zone sensor data from the set of zone sensors of the respective zones. Based on the first recognition information and the second recognition information, the first ECU sends at least one control signal to at least one vehicle actuator.

20 Claims, 11 Drawing Sheets

(56) References Cited

U.S. PATENT DOCUMENTS

| | | | |
|---|---|---|---|
| 2021/0366276 A1* | 11/2021 | Almeida | B60Q 1/507 |
| 2021/0403015 A1 | 12/2021 | Kato et al. | |
| 2022/0266776 A1* | 8/2022 | Kurokawa | B60R 16/0232 |
| 2022/0289175 A1* | 9/2022 | Kasarla | B60W 50/14 |
| 2022/0379857 A1* | 12/2022 | Bornemann | B60T 8/329 |

FOREIGN PATENT DOCUMENTS

| | | | | |
|---|---|---|---|---|
| CN | 110920602 A * | 3/2020 | | |
| CN | 113147964 A * | 7/2021 | | |
| CN | 113306408 A * | 7/2021 | | |
| DE | 102015114861 A1 * | 3/2016 | | B60Q 3/004 |
| DE | 102020123827 A1 * | 3/2021 | | B60W 50/0098 |
| JP | 2006004144 A | 1/2006 | | |
| JP | 2017074887 A * | 4/2017 | | B60R 16/023 |
| WO | WO 2019/026438 A1 * | 2/2019 | | |

\* cited by examiner

DISTRIBUTED PROCESSING OF VEHICLE SENSOR DATA

BACKGROUND

Advanced driver assistance systems (ADAS), as well as semi-autonomous vehicle systems, fully-autonomous vehicle systems, or other autonomous driving (AD) systems are systems that automate or otherwise enhance vehicle control for improved safety, automated navigation, and the like. These systems typically employ multiple types of sensors for recognizing the roadway and for recognizing and avoiding other vehicles, obstacles, pedestrians, etc. However, the sensors, processors, and other computing components that are used to process the sensor data can substantially increase the cost of a vehicle. Further, the power required by the sensors and the computing components may impose a significant drain on the battery of the vehicle if the vehicle is an electric vehicle. Additionally, if a central processor is relied on for most or all of the sensor data processing, this can leave the vehicle vulnerable to a single point of failure if the central processor fails, or is attacked by a virus, malware, or the like.

SUMMARY

In some implementations, a first electronic control unit (ECU) receives zone sensor data of a plurality of zones associated with a vehicle. For instance, a respective second ECU and a respective set of zone sensors is associated with each respective zone of the plurality of zones. Based on an indicated driving mode of the vehicle, the first ECU may perform recognition on the zone sensor data from a first zone of the plurality of zones to determine first recognition information. The first ECU receives second recognition information from the respective second ECUs of the respective zones. For instance, the respective second ECUs are configured to perform recognition processing on respective zone sensor data from the set of zone sensors of their respective zones. Based on the first recognition information and the second recognition information, the first ECU sends at least one control signal to at least one vehicle actuator.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
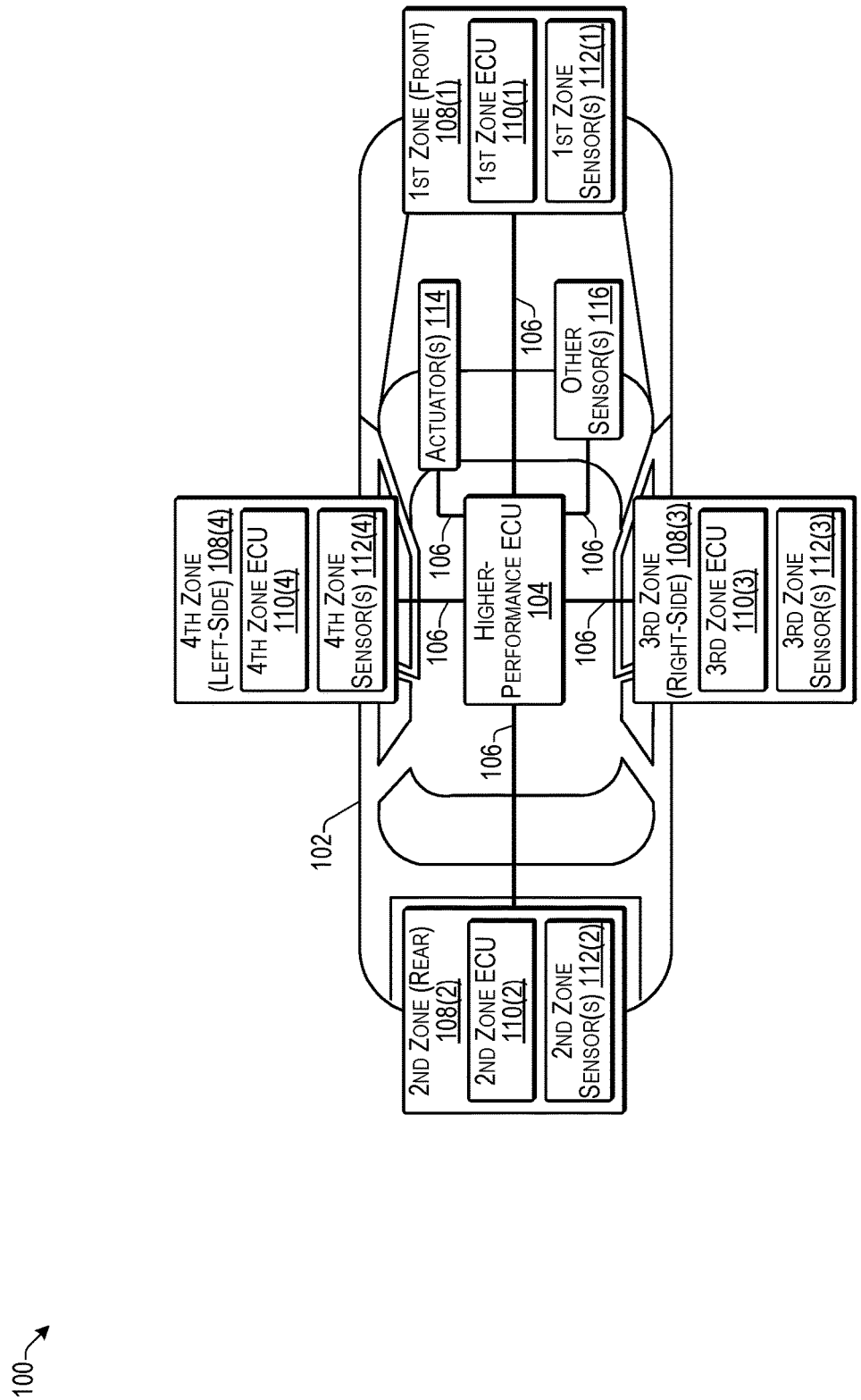
FIG. 1 illustrates an example system for distributed processing of vehicle sensor data according to some implementations.

Some implementations herein are directed to techniques and arrangements for employing a plurality of distributed processors and an intelligent processing distribution scheme for reducing the processing requirements placed on a primary processor for processing sensor data of a plurality of vehicle sensors for performing recognition and other tasks to enable ADAS and/or AD system operations for a vehicle. Examples herein may provide comparable performance to support vehicle operation, while improving resistance to component failure, malware, viruses, hacking, and so forth.

In some examples, the system may include a plurality of distinct onboard processors referred to herein as respective electronic control units (ECUs), which are able to receive sensor data from a plurality of respective sensors that perform sensing functions to enable the vehicle to operate as a partially or fully automated vehicle. As one example the system includes at least one higher-performance ECU (HPECU) and a plurality of zone ECUs. The HPECU may be a first type of ECU that may serve as a primary ECU and may include a relatively higher-performance processor that is capable of a greater capacity of data processing than the respective zone ECUs. The system may further include the plurality of zone ECUs, which may be a second type of ECU, each having a relatively lower-power processor, as compared with the HPECU, and therefore having a lower capacity of data processing as compared with the HPECU.

The zone ECUs may be disposed in strategic positions within the vehicle to be proximate to the respective sensors from which respective zone ECUs receive data. For example, each zone may correspond to a set of one or more sensors and a respective zone ECU may be assigned to a respective zone for processing the sensor data of the sensors corresponding to that respective zone. As one example, there may be four zones, e.g., a front, rear, left-side, and right side, each having a respective zone ECU and corresponding set of sensors, although other implementations herein may include more or fewer zones.

The zone ECUs are connected to the HPECU through a wired or wireless network, and can send at least one of processed or raw data to the HPECU. The zone ECUs are configured to receive the raw data from their respective sensors, condense or otherwise reduce the raw sensor data, and then process the reduced data to perform recognition processing, such as object detection, for determining the locations of detected objects relative to the vehicle. For selected vehicle operation modes, the HPECU may receive the raw sensor data from one or more selected zones that are determined to be of interest for the selected vehicle operation mode, and may process the raw data to perform recognition processing for the selected one or more zones. Because the HPECU has a higher computer processing capability, the HPECU can be configured to process the raw data and provide higher performance recognition results (e.g., more accurate, more detailed, etc.) than the corresponding zone ECU is capable of for a particular area of interest corresponding to the selected vehicle operation mode. The zone sensor data selected for processing by the HPECU is selected at least in part based on the indicated operation mode of the vehicle, such as based on the direction of travel, the speed of the vehicle, weather conditions, whether the vehicle is making a right turn, left turn, and so forth. In addition to processing the raw sensor data from one or more selected zones itself, the HPECU may also receive the recognition results from each of the zone ECUs. Accordingly, regardless of which ECU processed which sensor data, all of the recognition results may be used as inputs by the HPECU for determining one or more signals to send to one or more actuators or other devices of the vehicle.

For discussion purposes, some example implementations are described in the environment of selecting an ECU of a plurality of ECUs for processing sensor data based on an indicated driving mode of a vehicle. However, implementations herein are not limited to the particular examples provided, and may be extended to other types of processors, other techniques for distributing processing tasks, other types of data processing, other types of vehicles, other types of sensors, and so forth, as will be apparent to those of skill in the art in light of the disclosure herein. For instance, implementations herein may be used for personal vehicles, fleet vehicles and other commercially owned vehicles, trucks, freight haulers, or any other vehicle having some level of autonomy. Further, in the case of battery-powered vehicles, the decreased power consumption provided by implementations herein may increase the range of the battery-powered vehicle. Additionally, for internal combustion vehicles, implementations herein can decrease the fuel consumption of the vehicle.

FIG. 1 illustrates an example system 100 for distributed processing of vehicle sensor data according to some implementations. In this example, a vehicle 102 includes a higher-performance ECU (HPECU) 104 able to communicate over one or more networks with a plurality of zones 108, which, in the illustrated example, include a first zone 108(1) corresponding to a front of the vehicle 102; a second zone 108(2) corresponding to a rear of the vehicle 102; a third zone 108(3) corresponding to a right-side of the vehicle 102; and a fourth zone 108(4) corresponding to a left-side of the vehicle 102.

Each zone 108 includes a respective zone ECU 110 and a set of one or more of zone sensors 112. In this example, the first zone 108(1) includes a first zone ECU 110(1) and one or more first zone sensors 112(1); the second zone 108(2) includes a second zone ECU 110(2) and one or more second zone sensors 112(2); the third zone 108(3) includes a third zone ECU 110(3) and one or more third zone sensors 112(3); and the fourth zone 108(4) includes a fourth zone ECU 110(4) and one or more fourth zone sensors 112(4). As discussed additionally below, the respective zone ECU 110 for each respective zone 108 may receive the raw sensor data from the respective sensors 112 included in that respective zone 108.

In addition, the HPECU 104 is able to communicate over the one or more networks with one or more actuators 114, such as for sending one or more control signals to one or more of the actuators 114 based on results of sensor data processing performed by the HPECU 104 and the zone ECUs 110. For instance, the system 100 may be included in a vehicle 102 that has actuators that can control some or all aspects of vehicle operation, such as steering, brakes, accelerator, signaling, lighting, and so forth.

The zone sensor(s) 112 may typically include one or more of cameras (mono and/or stereo, visible light and/or near infrared), lidar sensors, radar sensors, ultrasonic sensors, thermal imaging sensors, and so forth. In addition, other sensors 116 may be included in the system 100 and, in some examples, may provide their sensor data directly to the HPECU 104. Examples of other sensors 116 may include a Global Navigation Satellite System (GNSS) sensor or other position sensor, a steering wheel position sensor (or a front wheel position sensor in the case that there is no steering wheel in the vehicle), a vehicle speed sensor; and various other vehicle condition sensors, as is known in the art. Furthermore, while FIG. 1 illustrates the other sensors 116 as providing sensor information directly to the HPECU 104, in other examples, the other sensors 116 may provide their sensor information to one or more of the zone ECUs 110.

The zone ECUs 110 are able to communicate with each other and the HPECU 104 over the one or more networks 106. For instance, vehicle ECUs may typically communicate with each other over a vehicle bus according to a vehicle bus protocol. As an example, the one or more networks may include a Controller Area Network bus (CAN bus) that enables communication according to the CAN bus protocol. The CAN bus protocol is a vehicle bus protocol that allows ECUs and other vehicle devices and systems to communicate with each other without a host computer. A CAN bus may include at least two different types. For example, high-speed CAN may be used in applications where the bus runs from one end of the environment to the other, while fault-tolerant CAN may be used where groups of nodes are connected together. Furthermore, the one or more networks 106 are not limited to a CAN bus protocol, and may include other types of wired and wireless networking technologies, such as Ethernet, fiber optics, Wi-Fi or other short range wireless technology, and so forth. Consequently, implementations herein are not limited to any particular networking technology or protocol.

As defined by the Society of Automotive Engineers (SAE), there are six levels of driving automation from Level 0 to Level 5. In particular, at "Level 0" (no driving automation) the driver performs all operating tasks such as steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control is one example of Level 2 autonomy.

The concept of autonomous driving mainly starts from "Level 3" (conditional driving automation), in which the vehicle itself may monitor the surroundings and may exert some control over the vehicle (e.g., automatic emergency braking). At "Level 4" (high driving automation) a vehicle may be able to drive independently most of the time but will not operate unless all conditions are met and an operator is still required to be able to take over. At "Level 5" (full driving automation) the vehicle is able to drive anywhere in all conditions without an operator. Accordingly, some examples herein may be useful for level 3-5 driving automation systems.

As mentioned above, the zone ECUs 110 may typically process the sensor data received from the respective sensors of the respective zone to which the zone ECU 110 is allocated. Depending on the current and upcoming mode of operation of the vehicle, the HPECU 104 may additionally or alternatively process the sensor data from one or more of the zones 108(1)-108(4). As one example, the HPECU 104 may receive the raw sensor data directly from the respective sensors in the respective zone, or alternatively, the HPECU 104 may receive the raw sensor data through the respective zone ECU 110 of the respective zone. Additional details are discussed below with respect to FIGS. 2-11.

Figure 2:
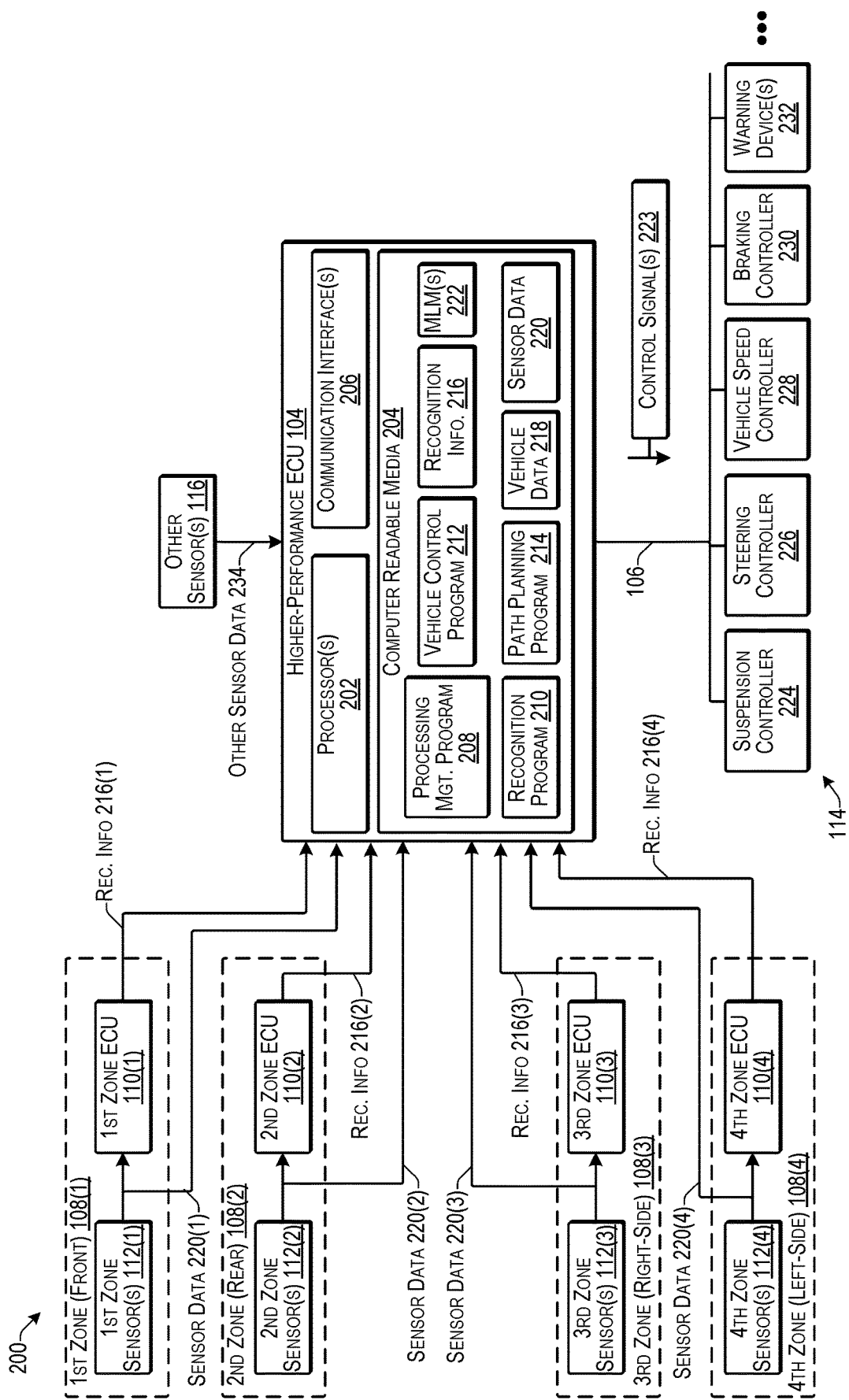
FIG. 2 illustrates an example physical and logical architecture of the system of FIG. 1 according to some implementations.

FIG. 2 illustrates an example physical and logical architecture 200 of the system 100 of FIG. 1 according to some implementations. In this example, the HPECU 104 includes one or more processors 202, one or more computer-readable media 204, and one or more communication interfaces 206. The one or more processors 202 may include one or more of central processing units (CPUs), graphics processing units (GPUs), microprocessors, microcomputers, microcontrollers, digital signal processors, state machines, logic circuits, and/or other devices that manipulate signals based on operational instructions. As one example, the processor(s) 202 may include one or more hardware processors and/or logic circuits of any suitable type specifically programmed or configured to execute the algorithms and other processes described herein. The processor(s) 202 may be configured to fetch and execute computer-readable instructions stored in the computer-readable media 204, which may program the processor(s) 202 to perform the functions described herein.

The computer-readable media 204 may include volatile and nonvolatile memory and/or removable and non-removable media implemented in any type of technology for storage of information, such as computer-readable instructions, data structures, programs, program modules, and other code or data. For example, the computer-readable media 204 may include, but is not limited to, RAM, ROM, EEPROM, flash memory or other memory technology, optical storage, solid state storage, magnetic disk, cloud storage, or any other medium that can be used to store the desired information and that can be accessed by a computing device. Depending on the configuration of the HPECU 104, the computer-readable media 204 may be a tangible non-transitory medium to the extent that, when mentioned, non-transitory computer-readable media exclude media such as energy, carrier signals, electromagnetic waves, and/or signals per se. In some cases, the computer-readable media 204 may be at the same location as the HPECU 104, while in other examples, the computer-readable media 204 may be partially remote from the HPECU 104, such as accessible over a wireless network or the like.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the HPECU 104. Functional components stored in the computer-readable media 204 may include a processing management program 208, a recognition program 210, a vehicle control program 212, and a path planning program 214, each of which may include one or more computer programs, applications, executable code, or portions thereof. While these programs 208-214 are illustrated as separate programs in this example, some or all of these programs may be combined into one or more programs, or divided into a larger number of programs, or the like.

In addition, the computer-readable media 204 may store data, data structures, and other information used for performing the functions and services described herein. For example, the computer-readable media 204 may store recognition information 216, vehicle data 218, sensor data 220, and, in some examples, one or more machine learning models (MLM(s)) 222 that may be used, e.g., by the recognition program 210 and/or the vehicle control program 212. The HPECU 104 may also include or maintain other functional components and data, which may include programs, drivers, etc., and the data used or generated by the functional components. Further, the HPECU 104 may include many other logical, programmatic, and physical components, of which those described above are merely examples that are related to the discussion herein.

The one or more communication interfaces 206 may include one or more software and hardware components for enabling communication with various other devices, such as over the one or more networks 106 and/or over a cellular network or other wireless communication network for communicating with external computing devices external to the vehicle 102 (not shown in FIG. 2). For example, the communication interface(s) 206 may enable communication through one or more of a LAN, the Internet, cable networks, cellular networks, wireless networks (e.g., Wi-Fi) and wired networks (e.g., CAN, fiber optic, Ethernet), direct connections, as well as close-range communications such as BLUETOOTH®, and the like.

The zone ECUs 110 may each have a hardware configuration similar to the HPECU 104, including one or more processors 202, one or more computer-readable media 204, and one or more communication interfaces 206. However, the zone ECUs 110 may have a substantially lower overall performance as compared to the HPECU 104, including lower performance components such as a lower performance processor 202 having a lower clock speed, lower performance memory, a smaller quantity of memory and other computer readable media, and so forth. Accordingly, the data processing capability of the respective zone ECUs may be substantially lower than that of the HPECU 104, such as may be measured in millions of operations per second (MOPS), millions of instructions per second (MIPS), data processing benchmarks, or as measured in the amount of time required to process the same amount of sensor data using the recognition program 210. As one example, the measured performance of the HPECU 104 may be greater than that of a respective zone ECU 110 by a factor of 10 or the like; however, implementations herein are not limited to any particular difference in the measured performance advantage of the HPECU 104 over that of the zone ECUs 110.

Furthermore, the zone ECUs 110 may also include or access some or all of the programs 208, 210, 212, 214, data 216, 218, 220, and the MLMs 222 discussed above that are included in or accessed by the HPECU 104. For example, should the HPECU 104 fail, the zone ECUs 110 may execute the necessary object recognition and vehicle control programs to enable the vehicle 102 to continue to operate safely. Additional details of this mode of operation are discussed below e.g., with respect to FIG. 4.

As discussed above, the respective sensors 112 in each zone 108 may provide sensor data 220 to the respective zone ECU 110 for that zone 108. In addition, the sensor data 220 from each set of the zone sensors 112 may also be received by the HPECU 104, and may be stored at least temporarily as the sensor data 220, such as in a buffer or the like provided by the computer readable media 204. In some cases, the sensor data 220 received directly from the sensors 112 may be referred to as raw sensor data because the data has not yet been subject to any data processing, filtering, normalizing, or the like. Accordingly, as illustrated in the example of FIG. 2, the HPECU 104 may receive first sensor data 220(1) from the first zone sensors 112(1), may receive second sensor data 220(2) from the second zone sensors 112(2), may receive third sensor data 220(3) from the third zone sensors 112(3), and may receive fourth sensor data 220(4) from the fourth zone sensors 112(4). However, while the HPECU 104 may receive the sensor data 220 from all of the zones 108, the HPECU 104 may ignore a large part of this sensor data, and may typically perform recognition processing on only a subset of the received sensor data 220, such as based on an indicated operation mode of the vehicle 102.

The zone ECUs 110 may also perform recognition processing on the received sensor data 220 for their respective zones 108. For example, the first zone ECU 110(1) may receive the raw sensor data 220(1) from the first zone sensors 112(1), may perform a data reduction process on the received sensor data 220(1) and may execute an instance of a recognition program 210 to perform recognition processing on the reduced sensor data 220(1). The first zone ECU 110(1) may send the results of the recognition processing as first recognition information 216(1) to the HPECU 104. Similarly, the second zone ECU 110(2) may send second recognition information 216(2) to the HPECU 104 based on results of recognition processing of the second sensor data 220(2) received from the second zone sensors 112(2). Likewise, the third zone ECU 110(3) may send third recognition information 216(3) to the HPECU 104, and the fourth zone ECU 110(4) may send fourth recognition information 216(4) to the HPECU 104. The HPECU 104 may use the received recognition information 216(1), 216(2), 216(3) and/or 216 (4), as well as recognition information determined by its own execution of the recognition program 210 as inputs to the vehicle control program 212 for determining one or more control signals 223 to send to the actuators 114. In the example of FIG. 2 the actuators 114 include a suspension controller 224, a steering controller 226, a vehicle speed controller 228, a braking controller 230, and one or more warning devices 232. Numerous other devices, systems, or other actuators in a vehicle that may receive control signals 123 will be apparent to those of skill in the art having the benefit of the disclosure herein.

As one example, the vehicle control program 212 may use rule-based and or machine-learning-based control algorithms to determine parameters for controlling the vehicle 102. For instance, based on the recognition information 216 determined by the HPECU 104, and the recognition information 216 received from the zone ECUs 110, the vehicle control program 212 may apply one or more of the machine learning models 222 for determining an appropriate action, such as braking, steering, decelerating, accelerating, or the like. Furthermore, the vehicle control program 212 may send the one or more control signals 223 to one or more vehicle systems in response to the recognition information 212. For example, the vehicle control program 212 may send control signals 223 to the suspension controller 224, the steering controller 226, the vehicle speed controller 228, and/or the braking controller 230. For instance, the control signals 223 may include a specified spring coefficient and/or damping control information sent to the suspension controller 224; specified steering angle sent to the steering controller 226 for steering one or more wheels; specified acceleration or deceleration control information sent to the vehicle speed controller 228; and/or specified brake control inform hima-tion for controlling the vehicle brakes. In addition, in some examples, a control signal 223 may also be sent to one or more warning devices 232, such as for sounding or displaying a warning to the vehicle occupant.

In addition, as mentioned above, the HPECU 104 may receive other sensor data 234 from the other sensors 102 in the vehicle 102. For instance, the vehicle may include a plurality of other sensors 116 in addition to the zone sensors 112 that may provide sensor information used by the vehicle control program 212. The other sensor data 234 may also include information received from or associated with various vehicle systems, such as position information or the like received from the suspension controller 224, the steering controller 226, a vehicle speed controller 228, and so forth.

As one example, such as in the case of level 3-5 autonomy, the HPECU 104 and the respective zone ECUs 110 may receive the raw sensor data 220 continually while the vehicle is in motion. Furthermore, the recognition programs 210 executed by the HPECU 104 and the respective zone ECUs 110 may process the received sensor data 220 to recognize road features, obstacles, and so forth. The HPECU 104 may provide the recognition information 216 about any detected obstacles, road features, etc., to the vehicle control program 212 which, in the case of level 3-5 autonomy, may take one or more actions in response to the recognition information. In some examples, the vehicle control program 212 and/or the recognition program 210 may fuse or otherwise combine and consolidate recognition information determined from image data with other types of sensor data (e.g., radar, lidar, ultrasound, etc.) for providing additional available information to the vehicle control program 212 for controlling the vehicle. Sensor fusion may take into consideration all sensor detection results (e.g., lidar, radar, other cameras), may compare the results of the various sensors with those of other sensors, and may use the combined results for performing vehicle control. If the sensors disagree about the presence or location of one or more potential obstacles, the sensor fusion functionality may determine a confidence value for each sensor, may determine how many sensors agree, may determine whether current environmental conditions may be adversely affecting sensor performance, and the like, and may determine to a conclusion as to the likelihood that that a particular object is actually present.

In addition, or alternatively, such as in the case that the vehicle is under control of a human driver, the vehicle control program 212 may send a control signal 223 to one or more warning devices 232, such as an audible or visual warning device. Examples of warning devices 232 include speakers that may generate an audible alert, haptic devices that may generate a vibration or other type of tactile alert (e.g., in a seat or steering wheel), and/or a visual signaling device that may generate a visual alert.

Figure 3:
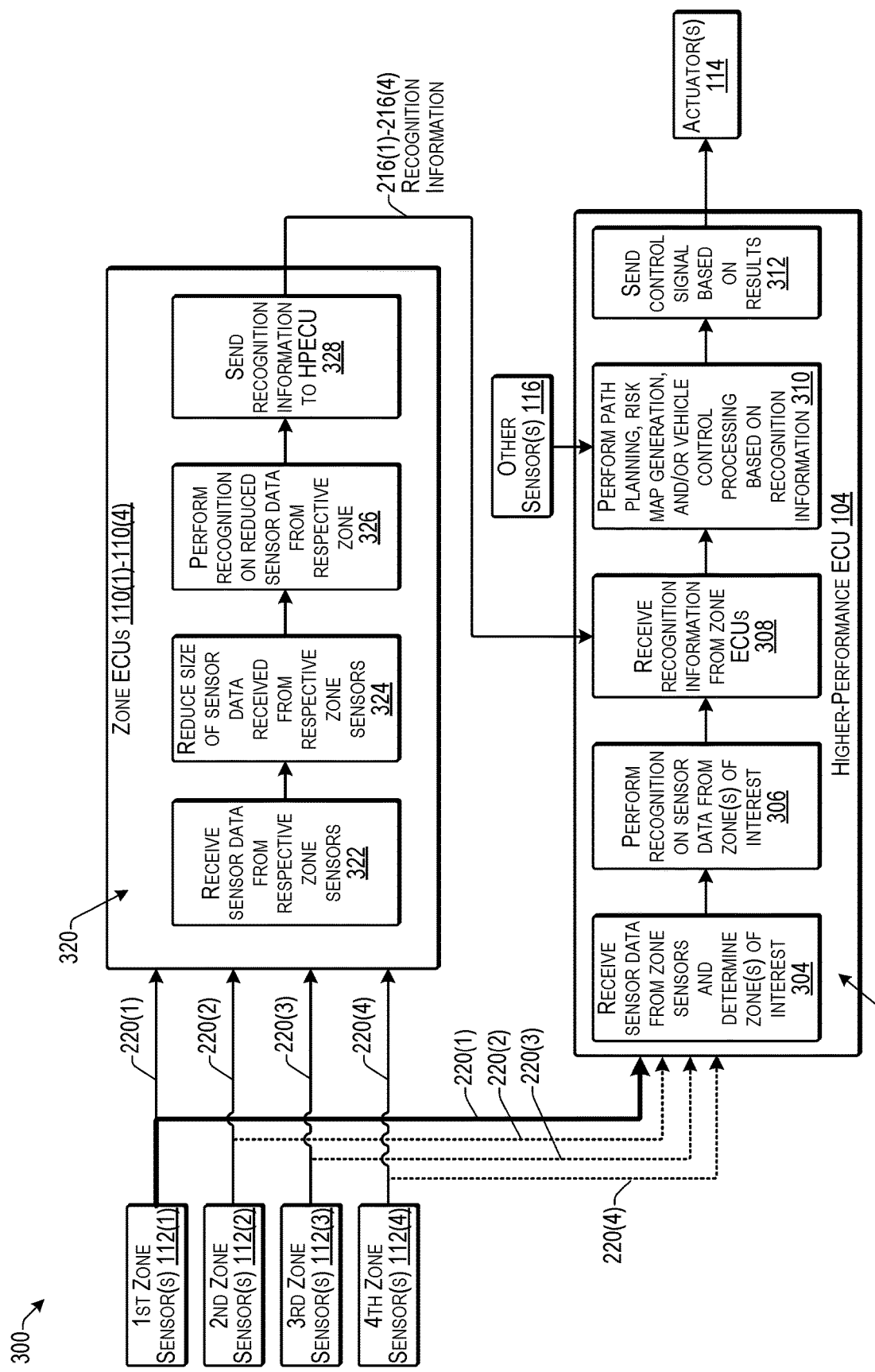
FIG. 3 illustrates an example of processes performed by a higher-performance electronic control unit (HPECU) and zone electronic control units (zone ECUs) according to some implementations.
Figure 4:
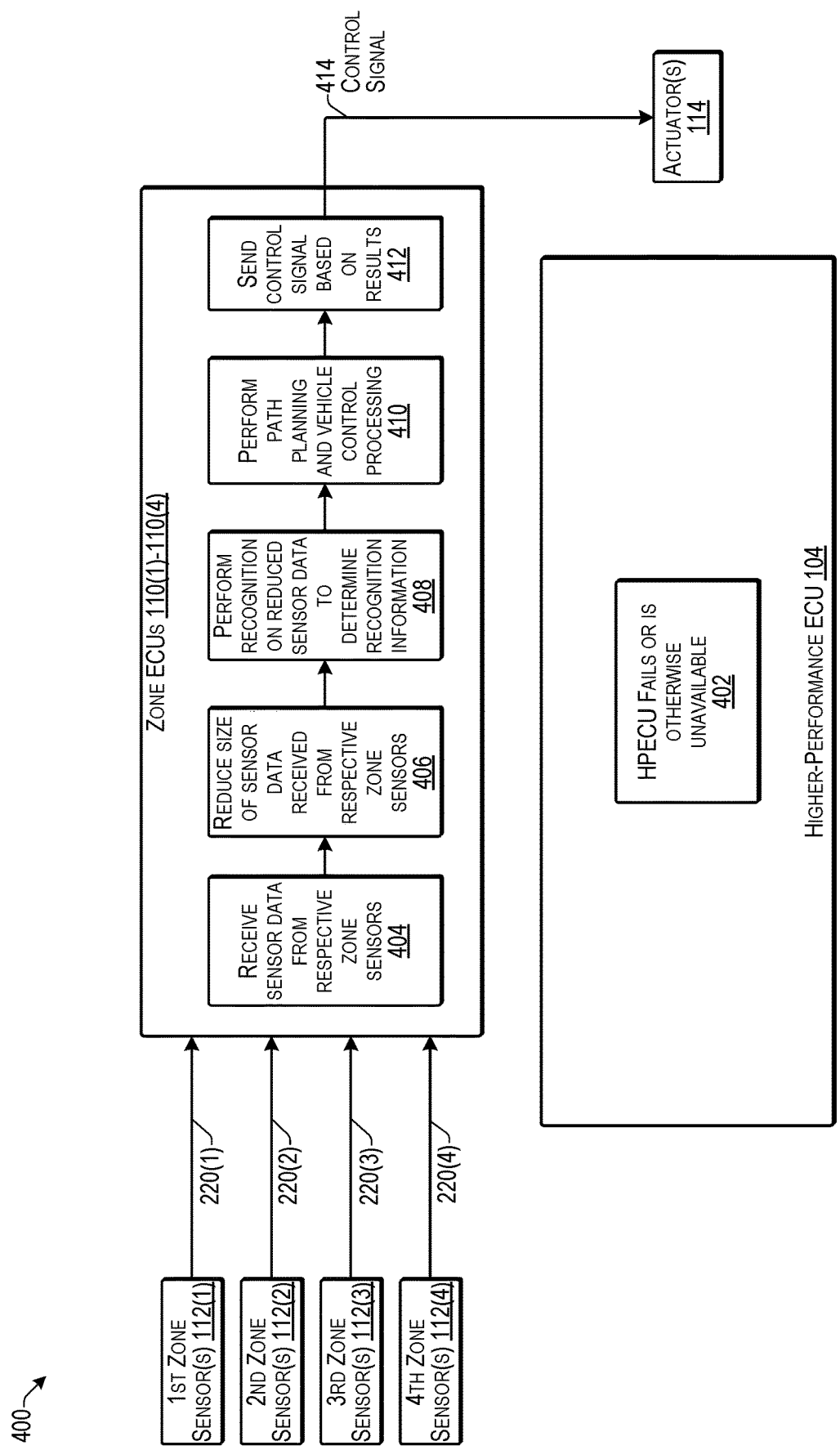
FIG. 4 illustrates an example process executed by one or more of the zone ECUs in the case of failure of the HPECU according to some implementations.
Figure 5:
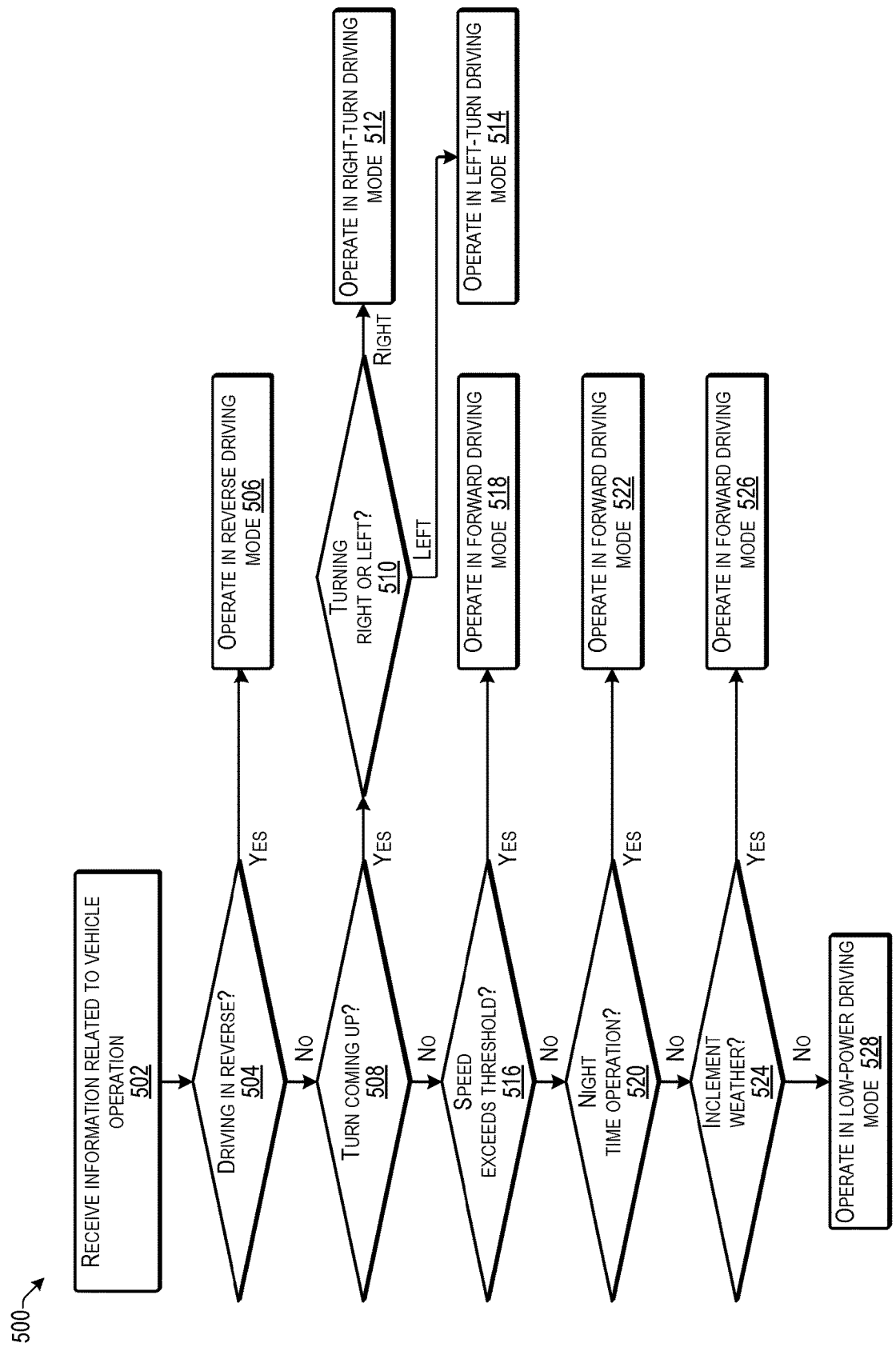
FIG. 5 is a flow diagram illustrating an example process for determining a vehicle operating mode according to some implementations.

FIGS. 3-5 include flow diagrams illustrating example algorithms or other processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 3 illustrates an example 300 of processes performed by the HPECU and the zone ECUs according to some implementations. As mentioned above, the zone ECUs 110 may be configured to perform recognition processing, such as object detection and basic sensor fusion on the sensor data 220 received from their respective zone sensors 112. The zone ECUs use one or more of the machine learning models 222 discussed above to perform deep machine learning to detect the location, relative speed, and identity of each recognized object visible or otherwise detectable on the side of the vehicle to which that zone corresponds. Each zone ECU 110 may include a relatively lower to mid-range processor, as discussed above. Because the zone ECU 110 includes a lower performance processor, the zone ECU 110 may not be capable of processing the raw data from its respective sensors within the necessary amount of time for ensuring vehicle safety. Accordingly, the zone ECUs 110 may crop the received raw images and reduce the resolution of the raw images and may similarly reduce the size of other sensor data, such as by reducing the sampling frequency of all the data from the respective sensors 112. The zone ECU may then process the reduced data to produce the recognition information 216, which may include producing a map (e.g., a disparity map) of the surroundings of the vehicle corresponding to the respective zone. Each zone ECU 110 may send the recognition information to the HPECU 104 for further analysis and as an input to the vehicle control program 212.

Furthermore, the HPECU 104 may also perform recognition processing on selected sensor data 220 from one or more of the zones depending on the indicated operation mode of the vehicle. For example, if the vehicle is driving in the forward direction over a threshold rate of speed, then the vehicle is operating in a forward driving mode and the HPECU 104 may perform recognition processing on the sensor data 220(1) collected by the first zone sensors 112(1) corresponding to the front of the vehicle. An example process 302 that may be executed by the HPECU 104 is set forth in FIG. 3.

At 304, the HPECU 104 receives sensor data from the zone sensors and determines one or more zones of interest based on the indicated operation mode of the vehicle. In the illustrated example, suppose that the indicated operation mode is forward driving mode. Accordingly, the HPECU 104 may perform processing on the sensor data 220(1) received from the first zone sensors 112(1), and may ignore or otherwise not process the sensor data received from the second, third and fourth zone sensors 112(2)-112(4).

At 306, the HPECU 104 may perform recognition on the sensor data from the zone of interest. In this example, the HPECU 104 may perform high resolution recognition on the raw sensor data 220-1 received from the first zone sensors 112-1. As mentioned above, the HPECU 104 may execute the recognition program 210, which may also employ one or more machine learning models 222 when performing the recognition. For instance, an output of the recognition program 210 may be a disparity map or other recognition information 216.

At 308, the HPECU 104 may receive recognition information 216(1)-216(4) from the respective zone ECUs 110(1)-110(4). In this example, the first zone ECU 110(1) may also perform recognition processing on the first zone sensor information 220(1). For instance, the HPECU 104 may compare the output recognition information 216(1) with its own recognition information determined from the processing of the first zone sensor data 220(1), such as for detecting any inconsistencies between the two recognition results. In other examples, to provide an additional reduction in power consumption, the first zone ECU 110(1) may be configured to not perform recognition processing when the recognition processing is being performed by the HP I ECU 104 for the sensor data 220(1).

At 310, the HPECU 104 may perform path planning, risk map generation, and/or vehicle control processing based on the recognition information determined by the HPECU 104 and also the recognition information received from the zone ECUs 110.

At 312, the HPECU 104 may send one or more control signals to one or more of the actuators 114 based on the results of the path planning, risk map generation and/or vehicle control processing.

In addition, each zone ECU 110 may execute a process 320 as described below.

At 322, the zone ECU 110 may receive sensor data 220 from the respective zone sensors of its zone.

At 324, the zone ECU 110 may reduce the size of the sensor data received from the respective zone sensors. As mentioned above, the zone ECU 110 may reduce the sampling rate of the sensor data, may reduce the resolution of the images received, may crop the received images, or may take other actions to reduce the size of the received data prior to performing recognition processing on the received data.

At 326, the zone ECU 110 may perform recognition processing on the reduced sensor data for the respective zone.

At 328, the zone ECU 110 may send recognition information 216 to the HPECU 104.

FIG. 4 illustrates an example process 400 executed by one or more of the zone ECUs in the case of failure of the HPECU according to some implementations. For example, in the event that the HPECU 104 has failed, as indicated at 402, the zone ECUs 110(1)-110(4) are also capable of operating the vehicle without the HPE ECU 104, albeit with lower accuracy than when the HPECU is operational. For instance, in some examples, the zone ECUs 110 are capable of performing typical ADAS functions, such as lane keeping, adaptive cruise control, automatic emergency braking, and the like. Further, depending on the specifications of the zone ECUs, in some cases, the zone ECUs 110 may also be able to perform fully autonomous driving in at least some driving conditions, or at a lower rate of speed, etc. Thus, the system herein is still able to operate the vehicle when any one component fails.

At 404, the zone ECU 110 receives sensor data from its respective zone sensors 112.

At 406, the zone ECU 110 reduces the size of the sensor data received from the respective zone sensors. As discussed above, the size reduction may include reducing the sampling frequency of the received sensor data, reducing the resolution of the received sensor data, cropping images in the received sensor data, and so forth.

At 408, the zone ECU 110 performs recognition on the reduced sensor data for determining recognition information. As one example, the recognition information may include or more disparity maps or any of various other kinds of information related to objects detected within range of the respective sensors.

At 410, the zone ECU may perform path planning and/or vehicle control processing. For example, one or more of the zone ECUs may execute an instance of a path planning program 214 and/or an instance of a vehicle control program 212. In some cases these programs 214 and 212 may be optimized for execution on a lower power processor than the HPECU 104. In some cases, the zone ECUs 110 may use any of various selection techniques to select one of the zone ECUs to perform the path planning and/or the vehicle control processing. As one example, if the vehicle is currently operating in the forward driving mode, then the zone ECU 110(2) associated with the second zone sensors 112(2) (i.e., the rear zone) may be selected to perform the path planning processing and/or the vehicle control processing while further reducing the sensor data received from the second zone sensors by a greater amount. As another example, one of the zone ECUs 110 may be selected to perform the path planning processing, while another zone ECU 110 may be selected to perform the vehicle control processing. Numerous other variations will be apparent to those of skill in the art having the benefit of the disclosure herein At 412, the zone ECU 110 performing the path planning and/or the vehicle control processing may send one or more control signals 414 to one or more of the actuators 114 based on the results.

FIG. 5 is a flow diagram illustrating an example process 500 for determining a vehicle operating mode according to some implementations. In some examples, the process 500 may be executed by the systems discussed above, such as by execution of the processing management program 208 on at least one of the HPECU 104 and/or on one or more of the zone ECUs 110.

At 502, the system may receive information regarding vehicle operation. For example, the system may receive satellite positioning information, information related to a planned route along which the vehicle is traversing, current speed information of the vehicle, current weather condition information, current daylight and time information, and so forth.

At 504, the system may determine whether the vehicle is driving in reverse. If so, the process goes to 506. If not, the process goes to 508.

At 506, if the indicated vehicle operation mode is that the vehicle is driving in reverse, the system may operate in a reverse driving mode in which the HPECU 104 processes the sensor information received from the sensors 112 corresponding to the rear zone of the vehicle, i.e. the second zone sensors 112(2) in the example zone configurations discussed above with respect to FIGS. 1-4.

At 508, the system may determine whether a turn is coming up. If so, the process goes to 510. If not, the process goes to 516.

At 510, when the system determines that the vehicle is approaching a turn the system may determine whether the vehicle will be turning right or left. If the vehicle is turning right the process goes to 512. If the vehicle is turning left the process goes to 514.

At 512, the system operates in right turn driving mode. For example during the right turn driving mode of vehicle operation, the HPECU 104 may process the sensor data 112 received from the sensors for the front zone and the left zone of the vehicle, e.g., corresponding to the first zone sensors 112(1) and the fourth zone sensors 112(4) in the example zone configurations discussed above with respect to FIGS. 1-4.

At 514, the system operates in left turn driving mode. For example during the left turn driving mode of vehicle operation, the HPECU 104 may process the sensor data 112 received from the sensors for the front zone and the right zone of the vehicle, e.g., corresponding to the first zone sensors 112(1) and the third zone sensors 112(3) in the example zone configurations discussed above with respect to FIGS. 1-4.

At 516, when the vehicle is not driving in reverse and is not approaching a turn, the system may determine whether the current speed of the vehicle exceeds a threshold speed. For example, when the vehicle speed exceeds a threshold speed such as 10 miles per hour, 20 miles per hour, 30 miles per hour, etc., it becomes more important for the front sensors to perform higher resolution sensing of the field of view in front of the vehicle for ensuring safety. Accordingly, if the vehicle speed exceeds the threshold, the process goes to 518. If not, the process goes to 520.

At 518, based on the vehicle speed exceeding the threshold, the system may operate in the forward driving mode in which the HPECU 104 processes the sensor information received from the sensors 112 corresponding to the front zone of the vehicle, i.e. the first zone sensors 112(1) in the example zone configurations discussed above with respect to FIGS. 1-4.

At 520, the system may determine whether the vehicle is operating during night time. If so, the process goes to 522. If not, the process goes to 524.

At 522, based on the vehicle being operated in the forward direction and during the nighttime, the system may operate in the forward driving mode in which the HPECU 104 processes the sensor information received from the sensors 112 corresponding to the front zone of the vehicle, i.e. the first zone sensors 112(1) in the example zone configurations discussed above with respect to FIGS. 1-4.

At 524, the system may determine whether the vehicle is being operated in inclement weather. If so, the process goes to 526. If not, the process goes to 528.

At 526, based on the vehicle being operated in the forward direction and during inclement weather the system may operate in the forward driving mode in which the HPECU 104 processes the sensor information received from the sensors 112 corresponding to the front zone of the vehicle, i.e. the first zone sensors 112(1) in the example zone configurations discussed above with respect to FIGS. 1-4.

At 528, the system may operate in a low power mode in which the HPECU 104 does not perform recognition processing on the sensor data 112 received from any of the zones. For example, based on the vehicle being operated in a forward direction with no turns coming up, at a speed below the threshold speed, and not during nighttime or during inclement weather, there is no need to perform high resolution processing of the sensor data. Accordingly, the recognition may be performed by the zone ECUs to reduce the power consumption of the HPECU 104. As one example, the zone ECUs 110 may send the determined recognition information to the HPECU 104 as inputs to the path planning program and/or the vehicle control program. As another example, in the low power mode, one or more of the zone ECUs 110 may execute the path planning program and/or the vehicle control program to further reduce the power consumed by the HPECU 104.

Figure 6:
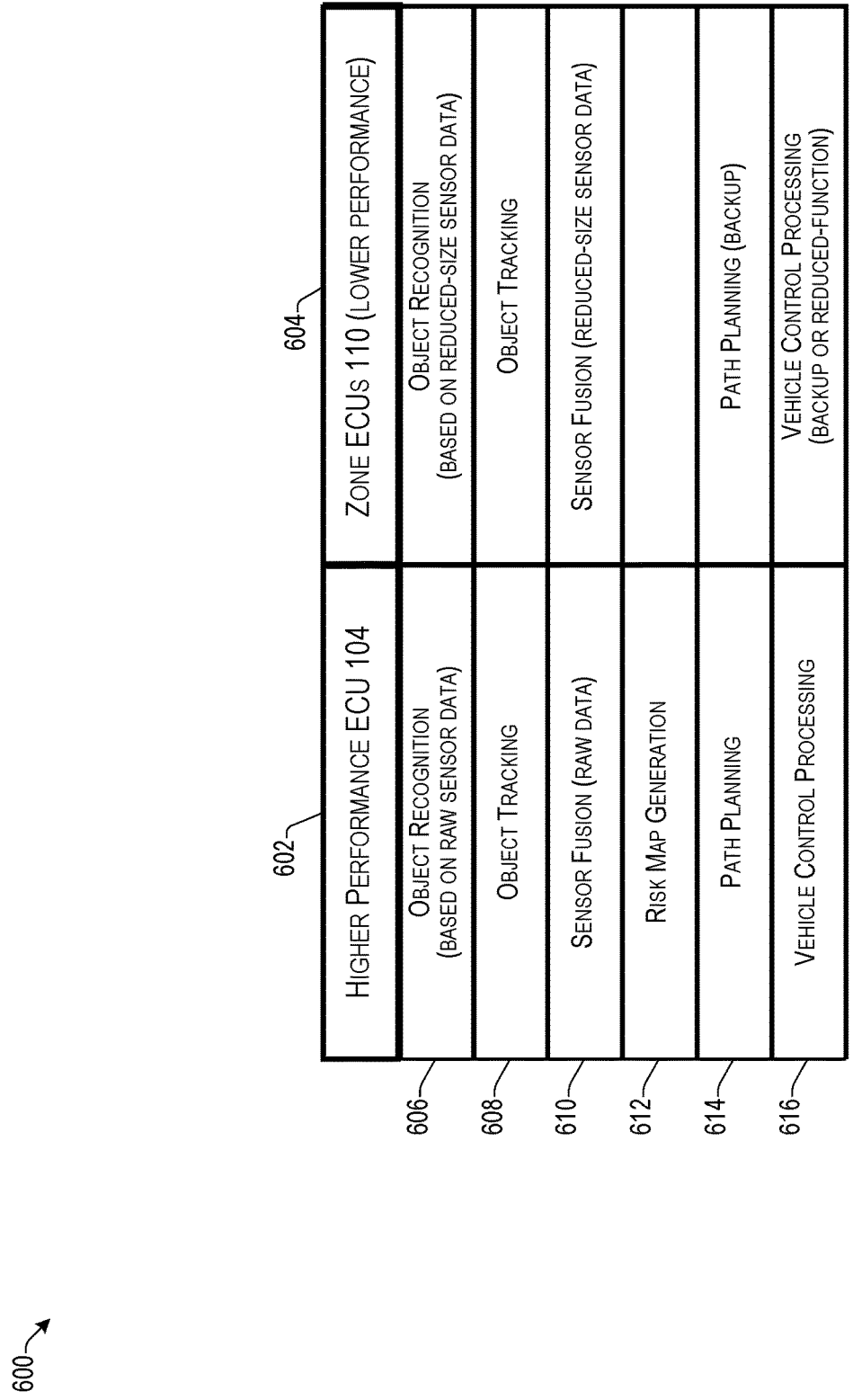
FIG. 6 illustrates a data structure showing a comparison of features and capabilities of the HPECU and the zone ECUs according to some implementations.

FIG. 6 illustrates a data structure 600 showing a comparison of features and capabilities of the HPECU 104 and the zone ECUs 110 according to some implementations. As mentioned above, the HPECU 104 includes one or more higher-performance processors, whereas the zone ECUs 110 include lower performance processors that consume less power than the HPECU processors. The HPECU 104 may receive the raw sensor data 120(1)-120(4) directly from the zone sensors 112(1)-112(4), respectively. The zone ECUs 110 typically receive the sensor data only from their assigned zone sensors 112. The HPECU 104 may perform recognition processing on some or none of the received sensor data 120(1)-120(4), depending on the indicated vehicle operation mode of the vehicle, and may receive recognition information determined by the zone ECUs 110.

The data structure 600 includes capabilities of the HPECU 104 listed at 602, and capabilities of the zone ECUs 110 listed at 604. For instance, as indicated at 606, the HPECU 104 may perform object recognition based on raw sensor data, while the zone ECUs 110 may perform object recognition based on reduced-size sensor data for their respective zone sensors. In addition, as indicated at 608, both the HPECU 104 and the zone ECUs 110 may perform object tracking based on the object recognition information that they have determined. Furthermore, as indicated at 610, the HPECU 104 may perform sensor fusion based on the raw sensor data, whereas the zone ECUs 110 may only perform sensor fusion based on the reduced size sensor data or recognized data as objects.

In addition, as indicated at 612, 614, and 616, the HPECU 104 may use the recognition information to perform additional processing such as risk map generation, path planning, and vehicle control. For instance, the HPECU 104 may generate a risk map, which may include creating a map of the area around the vehicle that indicates a level of risk associated with driving in each location. For instance, the risk map may be determined based at least on the identity, location, and relative speed of recognized objects and the terrain around the vehicle, as well as other information such as speed of the vehicle, weather conditions, time of day, and the like. The risk map may help ensure that the route that the HPECU 104 chooses does not endanger the vehicle occupants or the vehicle surroundings. However, determining a risk map may be computationally expensive, and in some examples herein, the zone ECUs 110 may not be capable of performing this operation in parallel with the recognition processing and other processing tasks.

Additionally, as indicated at 614, the HPECU 104 may perform path planning based on the recognition information determined by the HPECU 104 and also by the zone ECUs 110. In some examples, the zone ECUs 110 may perform path planning as a backup such as in the case that the HPECU 104 has failed. Similarly, the HPECU 104 may perform vehicle control processing based on the recognition information and other vehicle information. The zone ECUs 110 may perform vehicle control processing as a backup or as a reduced-function vehicle control, depending on the specific capabilities of the zone ECU processors, and such as in the case that the HPECU 104 has failed.

Figure 7:
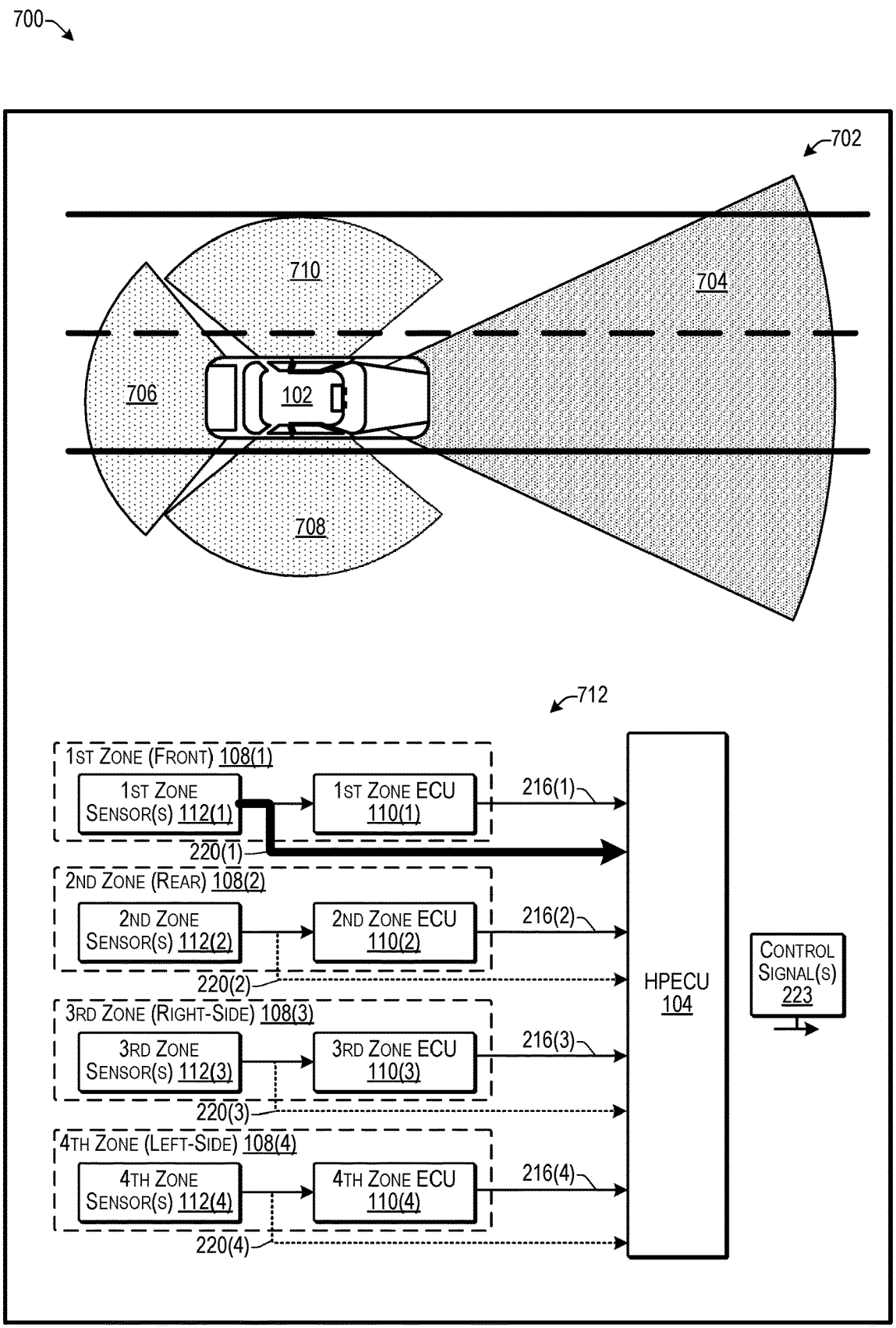
FIG. 7 illustrates an example of sensor areas of interest for a forward driving mode according to some implementations.

FIG. 7 illustrates an example 700 of sensor areas of interest for a forward driving mode according to some implementations. For instance, when the vehicle is indicated to be traveling in a forward direction, and the conditions of one of blocks 518, 522, or 526 of FIG. 5 are met, the HPECU 104 may operate in the forward driving mode in which the HPECU 104 processes the sensor data received from the forward-facing sensors corresponding to the first zone sensors 112(1).

As indicated at 702, in the forward driving mode, the field of view 704 of the forward facing sensors corresponds to the sensor data of interest for processing by the HPECU 104. In this example, the field of view 704 of the front facing sensors corresponds to the first zone sensors 112(1) discussed above; the field of view 706 of the rear facing sensors corresponds to the second zone sensors 112(2) discussed above; the field of view 708 of the right-side sensors corresponds to the third zone sensors 112(3) discussed above; and the field of view 710 of the left-side sensors corresponds to the fourth zone sensors 112(4) discussed above.

As indicated at 712, in the forward driving mode, the HPECU 104 performs recognition processing on the first zone sensor data 220(1) and does not perform recognition processing on the sensor data 220(2)-220(4) received from the second through fourth zone sensors 112(2)-112(4). For example, by having the HPECU 104 perform the recognition processing on the sensor data from the front field of view 704 provides more accurate higher resolution object detection, and therefore safer vehicle operation. In some examples, the first zone ECU 110(1) also performs recognition processing on the first zone sensor data 220(1). In that situation, the first zone ECU 110(1) may provide recognition information 216(1) to the HPECU 104, such as to provide redundancy, increased security, error checking, and the like. The other zone ECUs 110(2)-110(4) also provide respective recognition data 216(2)-216(4) to the HPECU 104 such as for path planning, risk map generation, and/or vehicle control processing.

Figure 8:
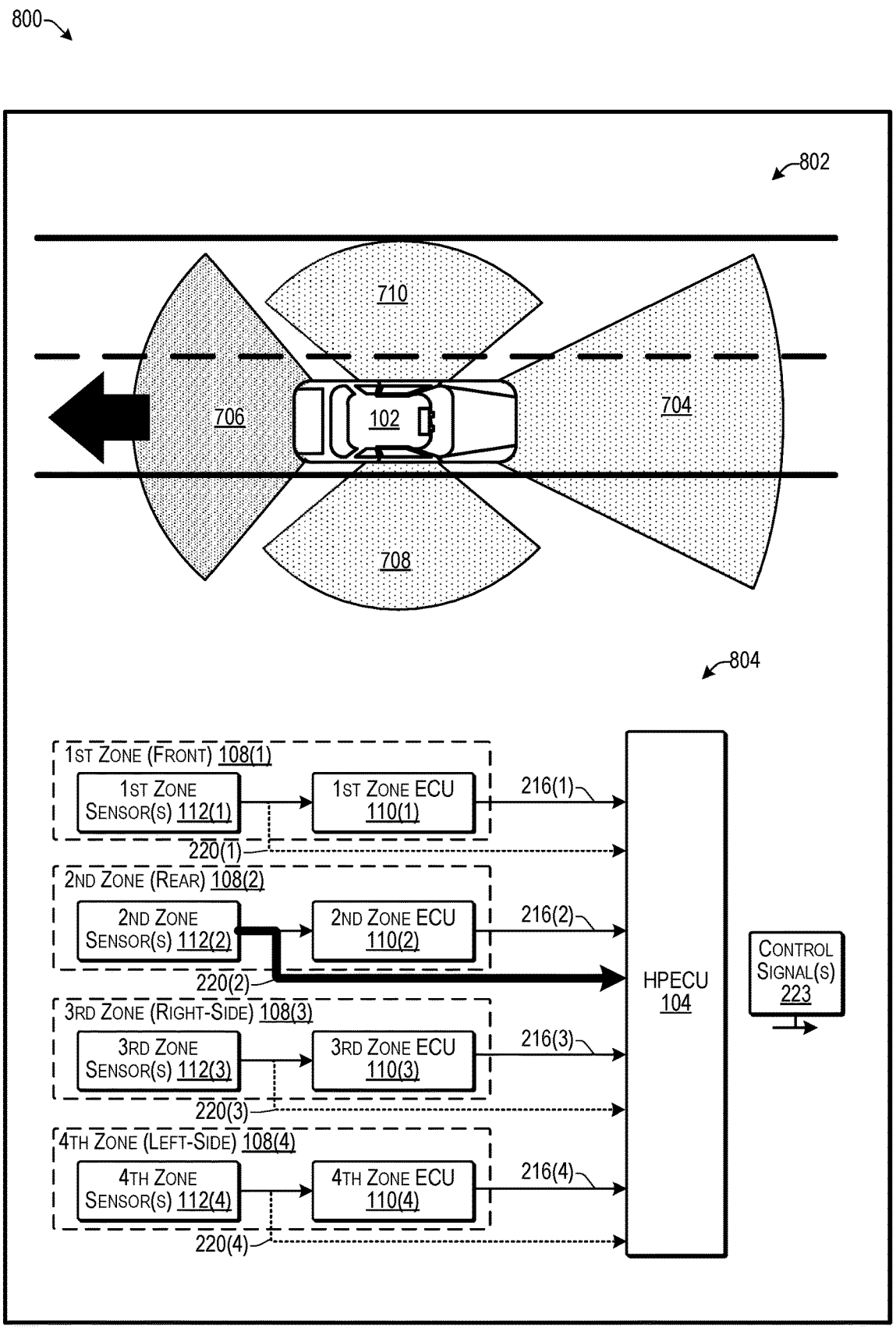
FIG. 8 illustrates an example of sensor areas of interest for a reverse driving mode according to some implementations.

FIG. 8 illustrates an example 800 of sensor areas of interest for a reverse driving mode according to some implementations. For instance, as indicated at 802, when the vehicle is driving in reverse, the sensor data corresponding to the field of view 706 is the sensor data of interest for processing by the HPECU 104. Thus, when the vehicle is indicated to be traveling in a reverse direction, and the conditions of block 506 of FIG. 5 are met, the HPECU 104 may operate in the reverse driving mode in which the HPECU 104 processes the sensor data received from the rear-facing sensors corresponding to the second zone sensors 112(2).

As indicated at 804, in the reverse driving mode, the HPECU 104 performs recognition processing on the second zone sensor data 220(2) and does not perform recognition processing on the sensor data 220(1), 220(3), or 220(4) received from the zone sensors 112(1), 112(3), and 112(4), respectively. Thus, when reverse driving mode is selected, the system focuses on the rear-facing sensors for processing by the HPECU 104 for performing higher accuracy recognition in the direction of travel. In some examples, the second zone ECU 110(2) also performs recognition processing on the second zone sensor data 220(2). In that situation, the second zone ECU 110(2) may provide recognition information 216(2) to the HPECU 104, such as to provide redundancy, increased security, error checking, and the like. The other zone ECUs 110(1), 110(3), and 110(4) also provide respective recognition data 216(1), 216(3) and 216(4) to the HPECU 104 such as for path planning, risk map generation, and/or vehicle control processing.

Figure 9:
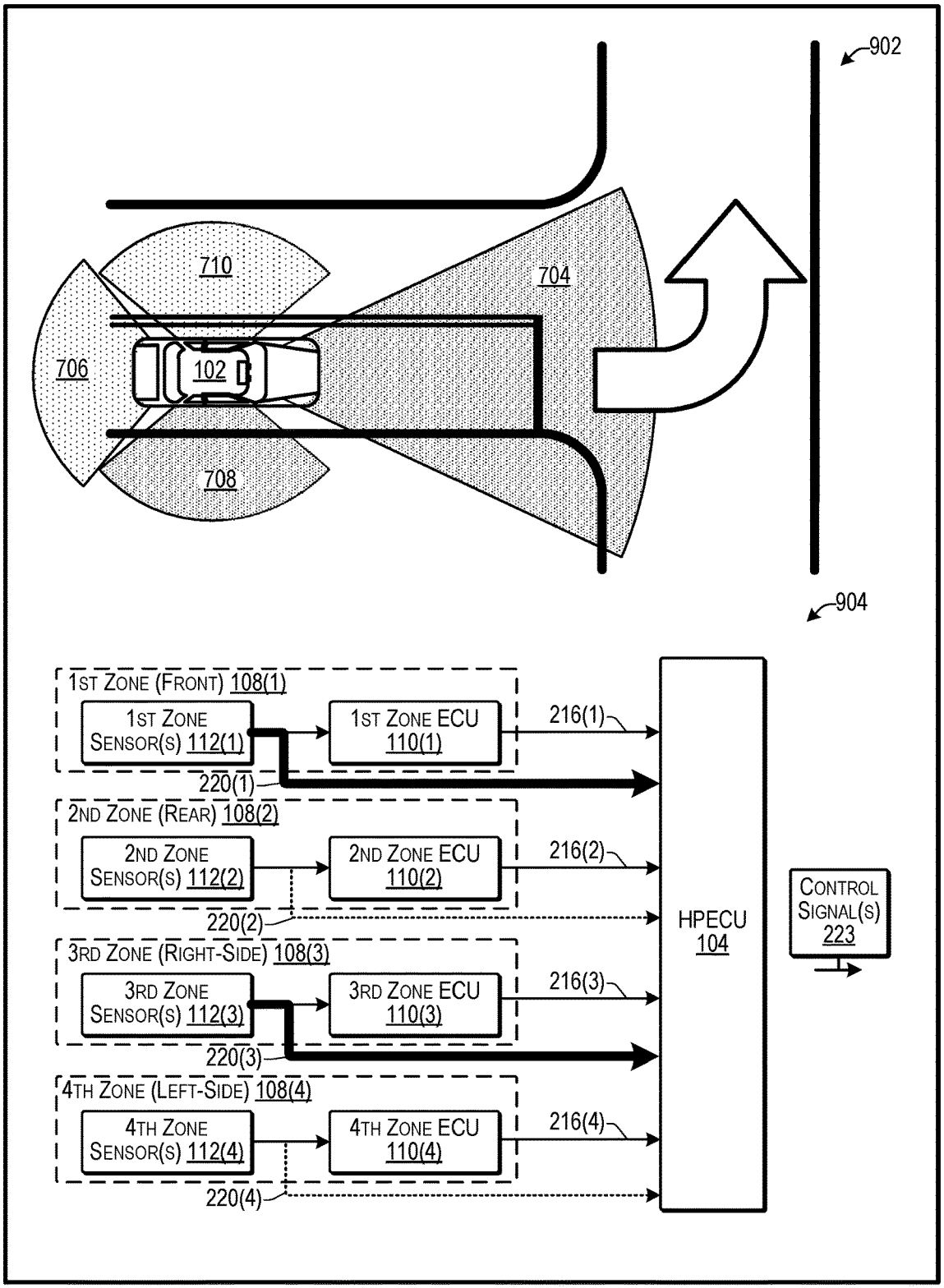
FIG. 9 illustrates an example of sensor areas of interest for a left-turn driving mode according to some implementations.

FIG. 9 illustrates an example 900 of sensor areas of interest for a left-turn driving mode according to some implementations. For instance, as indicated at 902, when the vehicle is making a left turn, the sensor data corresponding to the fields of view 704 and 708 (to detect oncoming traffic) may be the sensor data of interest for processing by the HPECU 104. Thus, when the vehicle is indicated to be making a left turn and the conditions of block 514 of FIG.

5 are met, the HPECU 104 may operate in the left turn driving mode in which the HPECU 104 processes the sensor data received from the front-facing sensors corresponding to the first zone sensors 112(1) and from the right-side sensor corresponding to the third zone sensors 112(3).

As indicated at 904, in the left-turn driving mode, the HPECU 104 performs recognition processing on the first zone sensor data 220(1) and the third zone sensor data 220(3), and does not perform recognition processing on the sensor data 220(2) or 220(4) received from the zone sensors 112(2) and 112(4), respectively. Thus, when left-turn driving mode is selected, the system focuses on the front-facing and right-side-facing sensors for processing by the HPECU 104 for performing higher accuracy recognition in these directions. In some examples, the first zone ECU 110(1) and the third zone ECU 110(3) also perform recognition processing on the sensor data 220(1) and 220(3), respectively. In that situation, the zone ECUs 110(1) and 110(3) may provide recognition information 216(1) and 216(3), respectively, to the HPECU 104, such as to provide redundancy, increased security, error checking, and the like. The other zone ECUs 110(2) and 110(4) also provide respective recognition data 216(2) and 216(4) to the HPECU 104 such as for path planning, risk map generation, and/or vehicle control processing.

Figure 10:
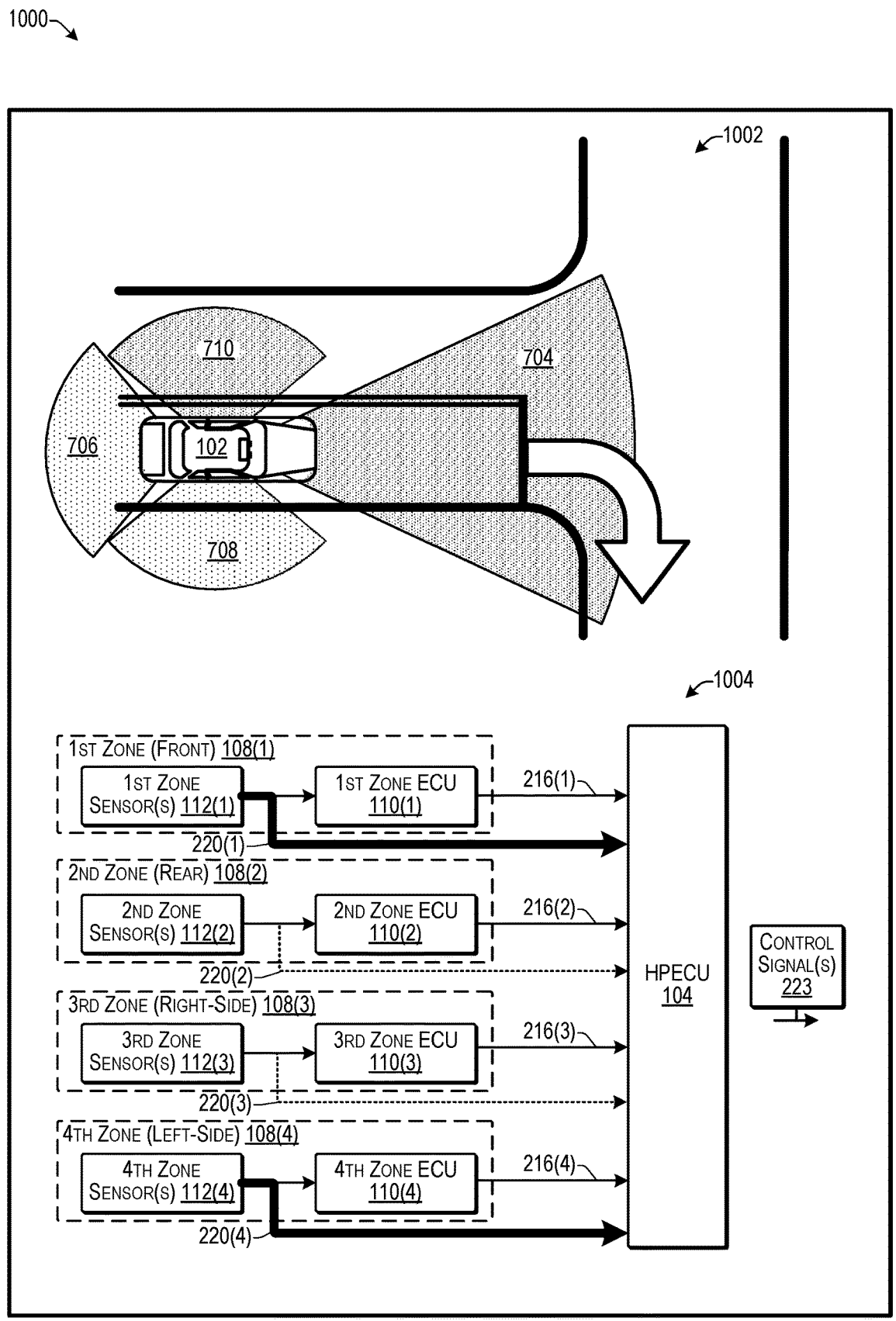
FIG. 10 illustrates an example of sensor areas of interest for a right-turn driving mode according to some implementations.

FIG. 10 illustrates an example 1000 of sensor areas of interest for a right-turn driving mode according to some implementations. For instance, as indicated at 1002, when the vehicle is making a right turn, the sensor data corresponding to the fields of view 704 and 710 (to detect oncoming traffic) may be the sensor data of interest for processing by the HPECU 104. Thus, when the vehicle is indicated to be making a right turn and the conditions of block 512 of FIG. 5 are met, the HPECU 104 may operate in the right-turn driving mode in which the HPECU 104 processes the sensor data received from the front-facing sensors corresponding to the first zone sensors 112(1) and from the left-side sensor corresponding to the fourth zone sensors 112(4).

As indicated at 1004, in the right-turn driving mode, the HPECU 104 performs recognition processing on the first zone sensor data 220(1) and the fourth zone sensor data 220(4), and does not perform recognition processing on the sensor data 220(2) or 220(3) received from the zone sensors 112(2) and 112(3), respectively. Thus, when right-turn driving mode is selected, the system focuses on the front-facing and left-side-facing sensors for processing by the HPECU 104 for performing higher accuracy recognition in these directions. In some examples, the first zone ECU 110(1) and the fourth zone ECU 110(4) also perform recognition processing on the sensor data 220(1) and 220(4), respectively. In that situation, the zone ECUs 110(1) and 110(4) may provide recognition information 216(1) and 216(4), respectively, to the HPECU 104, such as to provide redundancy, increased security, error checking, and the like. The other zone ECUs 110(2) and 110(3) also provide respective recognition data 216(2) and 216(3) to the HPECU 104 such as for path planning, risk map generation, and/or vehicle control processing.

Figure 11:
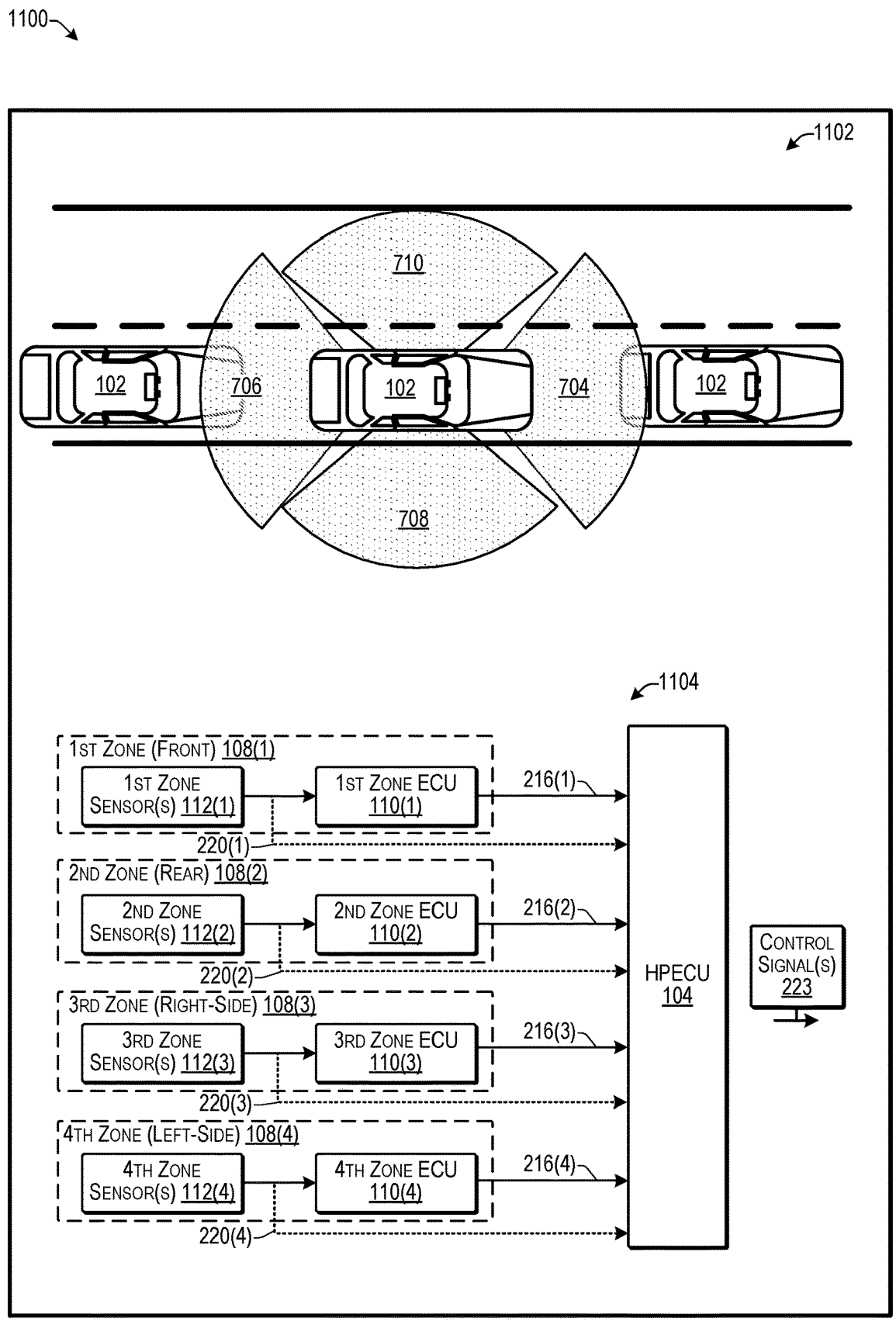
FIG. 11 illustrates an example of data processing for a lower-power driving mode according to some implementations.

FIG. 11 illustrates an example 1100 of data processing for a lower-power driving mode according to some implementations. For example, when the conditions of block 528 of FIG. 5 are met, the system does not need to focus on any of the sensor zones. As indicated at 1102, low-power driving mode may be implemented in situations in which the vehicle 102 is traveling forward below a threshold speed, during daylight, and in good weather. In such a situation, as indicated at 1104, the zone ECUs 110(1)-110(4) may perform all the recognition processing and may provide the recognition data 216(1)-216(4), respectively, to the HPECU 104, which may still perform risk map generation, path planning, and vehicle control processing. Operating the system in low power mode reduces the processing load on the HPECU 104, which reduces the power consumption of the HPECU 104.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system for processing sensor data in a vehicle, the system comprising:
 a first electronic control unit (ECU) able to communicate with a plurality of zone ECUs, wherein the first ECU has a higher data processing capability than respective zone ECUs of the plurality of zone ECUs, each respective zone ECU associated with a respective zone of a plurality of zones associated with the vehicle, wherein a set of zone sensors is associated with each respective zone to provide zone sensor data to the respective zone ECU associated with the respective zone, and wherein at least one zone sensor in each set of zone sensors is configured to detect whether an object is present in the respective zone, and if so, the location of the object relative to the vehicle, the first ECU including a processor configured by executable instructions to perform operations comprising:

receiving, by the processor of the first ECU, the zone sensor data from each set of zone sensors of each of the zones of the plurality of zones;

based on an indicated driving mode of the vehicle, selecting, by the processor of the first ECU, the zone sensor data of a first zone of the plurality of zones;

performing, by the processor of the first ECU, recognition on the zone sensor data of the first zone to determine first recognition information;

receiving, by the processor of the first ECU, second recognition information from the respective zone ECUs associated with the respective zones of the plurality of zones, the second recognition information being based on results of recognition processing by the respective zone ECUs of the respective zone sensor data; and sending, by the processor of the first ECU, based at least on the first recognition information and the second recognition information, at least one control signal to at least one vehicle actuator.

2. The system as recited in claim 1, the operations further comprising:

determining the indicated driving mode from information related to vehicle operation; and dynamically selecting, by the processor of the first ECU, the zone sensor data from the first zone for performing the recognition based on determining the indicated driving mode from the information related to the vehicle operation.

3. The system as recited in claim 1, the operations further comprising:

based on an indication of a change in the indicated driving mode, selecting, by the processor of the first ECU, zone sensor data from a second zone for performing the recognition, and ceasing performing the recognition on the zone sensor data received from the first zone.

4. The system as recited in claim 1, wherein the respective zone ECUs are configured to perform operations comprising:

receiving zone sensor data from the set of zone sensors associated with the respective zone associated with the respective zone ECU;

reducing, by the respective zone ECU, an amount of the zone sensor data to obtain reduced sensor data;

performing recognition on the reduced sensor data to obtain recognition information; and sending the recognition information to the first ECU as a portion of the second recognition information.

5. The system as recited in claim 1, wherein the indicated driving mode of the vehicle is one of:

a forward driving mode in which the vehicle is traveling in a forward direction; or a reverse driving mode in which the vehicle is traveling in a reverse direction.

6. The system as recited in claim 1, wherein the indicated driving mode of the vehicle is one of:

a left-turn driving mode in which the vehicle is approaching a left turn; or a right-turn driving mode in which the vehicle is approaching a right turn;

wherein the operations further include:

selecting, by the processor of the first ECU, the zone sensor data of a second zone of the plurality of zones based on the indicated driving mode being one of the left-turn driving mode or the right-turn driving mode; and performing, by the processor of the first ECU, recognition on the zone sensor data of the second zone in addition to the zone sensor data of the first zone to determine the first recognition information.

7. The system as recited in claim 1, the operations further comprising:

based at least on an indicated vehicle speed being below a threshold speed, selecting a lower-power driving mode and ceasing, by the processor of the first ECU, the performing the recognition, wherein the zone ECUs provide the second recognition information for the respective zones to the first ECU.

8. A method comprising:

receiving, by a first electronic control unit (ECU), zone sensor data of a plurality of zones associated with a vehicle, wherein a respective second ECU and a respective set of zone sensors is associated with each respective zone of the plurality of zones, and wherein at least one zone sensor in each set of zone sensors is configured to detect whether an object is present in the respective zone, and if so, the location of the object relative to the vehicle;

based on an indicated driving mode of the vehicle, performing, by the first ECU, recognition on the zone sensor data from a first zone of the plurality of zones to determine first recognition information;

receiving, by the first ECU, second recognition information from one or more of the respective second ECUs associated with the respective zones, wherein the respective second ECUs are configured to perform recognition processing on respective zone sensor data from the set of zone sensors of the respective zone with which the respective second ECU is associated; and sending, by the first ECU, based at least on the first recognition information and the second recognition information, at least one control signal to at least one vehicle actuator.

9. The method as recited in claim 8, wherein the first ECU has a higher data processing capability than the respective second ECUs associated with the respective zones.

10. The method as recited in claim 8, further comprising:

receiving, by the first ECU, the zone sensor data from each set of zone sensors of each of the zones of the plurality of zones; and dynamically selecting, by the first ECU, the zone sensor data from the first zone for performing recognition based on determining the indicated driving mode from information related to vehicle operation.

11. The method as recited in claim 8, further comprising:

based on an indication of a change in the indicated driving mode, selecting, by the first ECU, zone sensor data from a second zone for performing the recognition, and ceasing performing the recognition on the zone sensor data received from the first zone.

12. The method as recited in claim 8, wherein the respective second ECUs are configured to:

receive zone sensor data from the set of zone sensors associated with the respective zone associated with the respective second ECU;

reduce an amount of the zone sensor data to obtain reduced sensor data;

perform recognition on the reduced sensor data to obtain recognition information; and send the recognition information to the first ECU as a portion of the second recognition information.

13. The method as recited in claim 8, wherein the indicated driving mode of the vehicle is one of:

a left-turn driving mode in which the vehicle is approaching a left turn; or a right-turn driving mode in which the vehicle is approaching a right turn;

the method further comprising:

selecting, by the first ECU, the zone sensor data of a second zone of the plurality of zones based on the indicated driving mode being one of the left-turn driving mode or the right-turn driving mode; and performing, by the first ECU, recognition on the zone sensor data of the second zone in addition to the zone sensor data of the first zone to determine the first recognition information.

14. The method as recited in claim 8, wherein subsequent to a failure of the first ECU, one of the second ECUs is configured to send, based at least on subsequently determined second recognition information, at least one subsequent control signal to at least one vehicle actuator.

15. A system comprising:

a first electronic control unit (ECU) disposed in a vehicle and able to communicate with a plurality of second ECUs disposed in the vehicle, wherein each respective second ECU is associated with a respective zone of a plurality of zones associated with the vehicle, wherein at least one respective sensor is associated with each respective zone to provide zone sensor data for the respective zone to the respective second ECU associated with the respective zone, and wherein the at least one respective sensor is configured to detect whether an object is present in the respective zone, and if so, the location of the object relative to the vehicle, the first ECU configured by executable instructions to perform operations comprising:

receiving, by the first ECU, the zone sensor data the respective zones of the plurality of zones;

based on an indicated driving mode of the vehicle, performing, by the first ECU, recognition on the zone sensor data from a first zone of the plurality of zones to determine first recognition information;

receiving, by the first ECU, second recognition information from one or more of the respective second ECUs associated with the respective zones, wherein the respective second ECUs are configured to perform recognition processing on respective zone sensor data from the at least one respective sensor associated with the respective zone with which the respective second ECU is associated; and sending, by the first ECU, based at least on the first recognition information and the second recognition information, at least one control signal to at least one vehicle actuator.

16. The system as recited in claim 15, wherein the first ECU has a higher processing capability than the respective second ECUs associated with the respective zones.

17. The system as recited in claim 15, the operations further comprising:

based on an indication of a change in the indicated driving mode, selecting, by the first ECU, zone sensor data from a second zone for performing the recognition, and ceasing performing the recognition on the zone sensor data received from the first zone.

18. The system as recited in claim 15, wherein the respective second ECUs are configured to:

receive zone sensor data from the set of zone sensors associated with the respective zone associated with the respective second ECU;

reduce an amount of the zone sensor data to obtain reduced sensor data;

perform recognition on the reduced sensor data to obtain recognition information; and send the recognition information to the first ECU as a portion of the second recognition information.

19. The system as recited in claim 15, wherein the indicated driving mode of the vehicle is one of:

a left-turn driving mode in which the vehicle is approaching a left turn; or a right-turn driving mode in which the vehicle is approaching a right turn;

the method further comprising:

selecting, by the first ECU, the zone sensor data of a second zone of the plurality of zones based on the indicated driving mode being one of the left-turn driving mode or the right-turn driving mode; and performing, by the first ECU, recognition on the zone sensor data of the second zone in addition to the zone sensor data of the first zone to determine the first recognition information.

20. The system as recited in claim 15, wherein subsequent to a failure of the first ECU, one of the second ECUs is configured to send, based at least on subsequently determined second recognition information, at least one subsequent control signal to at least one vehicle actuator.

* * * * *